United States Patent
Alam et al.

(10) Patent No.: US 9,544,353 B2
(45) Date of Patent: Jan. 10, 2017

(54) DYNAMIC ACTIVATION OF WEB APPLICATIONS

(75) Inventors: Bilal Alam, Bellevue, WA (US); Fabio Alexandre Yeon, Mill Creek, WA (US); Jaroslav Dunajsky, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 877 days.

(21) Appl. No.: 13/162,274

(22) Filed: Jun. 16, 2011

(65) Prior Publication Data

US 2012/0324066 A1    Dec. 20, 2012

(51) Int. Cl.
G06F 15/177    (2006.01)
H04L 29/08    (2006.01)
G06F 9/48    (2006.01)
G06F 9/54    (2006.01)

(52) U.S. Cl.
CPC ............ H04L 67/02 (2013.01); G06F 9/4843 (2013.01); G06F 9/54 (2013.01)

(58) Field of Classification Search
CPC ........ H04L 67/34; H04L 67/02; G06F 9/4843; G06F 9/54
USPC ....................................... 709/222
See application file for complete search history.

(56) References Cited

U.S. PATENT DOCUMENTS

2002/0059170 A1    5/2002    Vange
2004/0054996 A1*   3/2004    Srinivas .................. H04L 69/16 718/1
2007/0060363 A1*   3/2007    Nguyen .................. G07F 17/32 463/42

(Continued)

FOREIGN PATENT DOCUMENTS

KR    1020100111809    * 11/2010

OTHER PUBLICATIONS

Ramamurthy, et al., "Using Mini-Flash Crowds to Infer Resource Constraints in Remote Web Servers", Retrieved at <<http://www2.research.att.com/~bala/papers/inm07.pdf>>, Proceedings of the 2007 SIGCOMM workshop on Internet network management, Aug. 27-31, 2007, pp. 6.

(Continued)

Primary Examiner — Tonia L Dollinger
Assistant Examiner — Steven Nguyen
(74) Attorney, Agent, or Firm — Kevin Sullivan; Kate Drakos; Micky Minhas

(57) ABSTRACT

Techniques are described herein that are capable of dynamically activating web applications. For instance, such applications may not be configured on a machine until requests for those applications are received by the machine. For example, upon receipt of such a request, the machine may automatically configure an application that is identified by the request on the machine. The machine may then forward the request to the application for processing. In another example, the machine may run an application-agnostic worker process (AAWP), which configures an application on the machine upon receipt of a request for the application. An AAWP is a worker process that is capable of processing requests for web application(s) that are not previously associated with the AAWP. The AAWP may cause a specified worker process to run on the machine, so that the specified worker process may process the request and/or subsequent requests for the application.

20 Claims, 6 Drawing Sheets

(56) References Cited

U.S. PATENT DOCUMENTS

| | | | | |
|---|---|---|---|---|
| 2008/0141244 A1* | 6/2008 | Kelley | ................... | 717/178 |
| 2009/0187658 A1 | 7/2009 | Williams et al. | | |
| 2010/0058330 A1* | 3/2010 | DeHaan | ................... | G06F 8/60 |
| | | | | 717/177 |
| 2010/0293544 A1* | 11/2010 | Wilson et al. | ................... | 718/1 |
| 2012/0117190 A1* | 5/2012 | Park et al. | ................... | 709/217 |
| 2012/0220263 A1* | 8/2012 | Smith et al. | ................... | 455/410 |
| 2012/0271951 A1* | 10/2012 | Lee et al. | ................... | 709/226 |
| 2014/0164490 A1* | 6/2014 | Nakamura et al. | ................... | 709/203 |

OTHER PUBLICATIONS

Gupta, Manav, "Cloud Automation by IBM aka IBM Service Delivery Manager", Retrieved at <<http://manavg.wordpress.com/tag/ibm-service-delivery-manager/>>, Retrieved at: Apr. 6, 2011, pp. 5.

Pradhan, et al., "An Observation-based Approach Towards Self-managing Web Servers", Retrieved at <<http://www-users.cs.umn.edu/~chandra/papers/iwqos02/paper.pdf>>, Proceedings of Tenth IEEE International Workshop on Quality of Service, vol. 29 No. 8, May 2002, pp. 10.

Voigt, et al., "Adaptive Resource-based Web Server Admission Control", Retrieved at <<http://www.cse.iitb.ac.in/~varsha/allpapers/webOverload/voight-gunninberg.pdf>>, Proceedings of seventh International Symposium on Computers and Communication, Jul. 2002, pp. 6.

"IIS Windows Process Activation Service (WAS)", Retrieved at <<http://technet.microsoft.com/en-us/library/cc735229(WS.10).aspx>>, Retrieved Date: Apr. 6, 2011, pp. 2.

* cited by examiner

DYNAMIC ACTIVATION OF WEB APPLICATIONS

BACKGROUND

Individual web servers traditionally are configured with a static set of configuration information, metadata, and content in order to serve a web application. The expectation is that by the time a request for a specific application reaches a specific server, the server has already been setup to handle that request due to previous configuration steps. Accordingly, processing a request for a web application such conventional load-balanced web server cluster configurations assumes a-priori knowledge of which server(s) have been pre-configured for a given web application.

For instance, conventional techniques for activating web applications use a custom provisioning system that runs in parallel to a web server cluster. The responsibility of the custom provisioning system is to manage application-to-server configuration. In this approach, the custom provisioning system acts as a web server cluster "master" that is responsible for deploying web applications onto specific web servers. For instance, the approach may be thought of as a "push" web application deployment approach.

In environments with relatively low numbers of unique applications (e.g., a corporate environment), it may be relatively straightforward to manually configure servers and assign web applications to run on one or more of the servers. However, in hosting environments (e.g., cloud-hosting environments), the number of web applications that run on a server cluster may be orders of magnitude larger. For example, tens of thousands, hundreds of thousands, etc. of applications may run in a large-scale cloud environment. Consequently, manual configuration and assignment of web applications to servers may be logistically infeasible.

SUMMARY

Various approaches are described herein for, among other things, dynamically activating web applications. For instance, web applications may not be configured on a machine (e.g., a physical machine such as a web server, or a virtual machine) until requests for those web applications are received by the machine. For example, upon receipt of such a request, the machine may automatically configure a web application that is identified by the request on the machine. The machine may then forward the request to the web application for processing. In another example, the machine may run an application-agnostic worker process, which configures a web application on the machine upon receipt of a request for the web application. An application-agnostic worker process (AAWP) is a worker process that is capable of processing requests for web application(s) that are not previously associated with the AAWP. For instance, the AAWP may configure the web application based on information that is included in the request. In some aspects, the AAWP may cause a specified worker process to run on the machine, so that the specified worker process may process the request and/or subsequent requests for the web application. Accordingly, such subsequent requests may be processed by the specified worker process without first being processed by the AAWP.

A method is described in which a request for a web application is received at a machine on which the web application is not configured. The web application is identified based on information that is included in the request. A determination is made that the web application is not configured on the machine. The web application is automatically configured on the machine. The request is provided to the web application.

Another method is described. In accordance with the method, configuration of each of a plurality of web applications on a machine is deferred until a request for the respective web application is received at the machine. A request for a specified web application is received at an application-agnostic worker process that is running on the machine. The specified web application is configured on the machine. The request for the specified web application is provided to the specified web application by the application-agnostic worker process. A network binding is established for the specified web application that causes subsequent requests for the specified web application to be routed to the specified web application without first being routed to the application-agnostic worker process.

A system is described that includes a dynamic activation module, which is configured to defer configuration of web applications on a machine until requests for the web applications are received at the machine. The dynamic activation module includes a request router, an application-agnostic worker process module, and a specified worker process module. The request router is configured to determine whether web applications that correspond to respective requests that are received at the machine are configured on the machine. The request router is further configured to route a request for a specified web application to an application-agnostic worker process in response to the specified web application not being configured on the machine. The request router is further configured to route the request for the specified web application to a specified worker process that corresponds to the specified web application in response to the specified web application being configured on the machine. The application-agnostic worker process module is configured to execute the application-agnostic worker process. The application-agnostic worker process module includes a configuration module, a provision module, and a binding module. The configuration module is configured to configure the specified web application on the machine in response to receipt of the request for the specified web application at the application-agnostic worker process. The configuration module is configured to initiate execution of the specified worker process on the specified worker process module. The provision module is configured to provide the request for the specified web application to the specified worker process. The binding module is configured to establish a network binding for the specified web application that causes subsequent requests for the specified web application to be routed to the specified web application without first being routed to the application-agnostic worker process. The specified worker process module is configured to execute the specified worker process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example dynamic activation system in accordance with an embodiment.

FIGS. 2, 4, and 5 depict flowcharts of example methods for dynamically activating a web application in accordance with embodiments.

Figure 1:
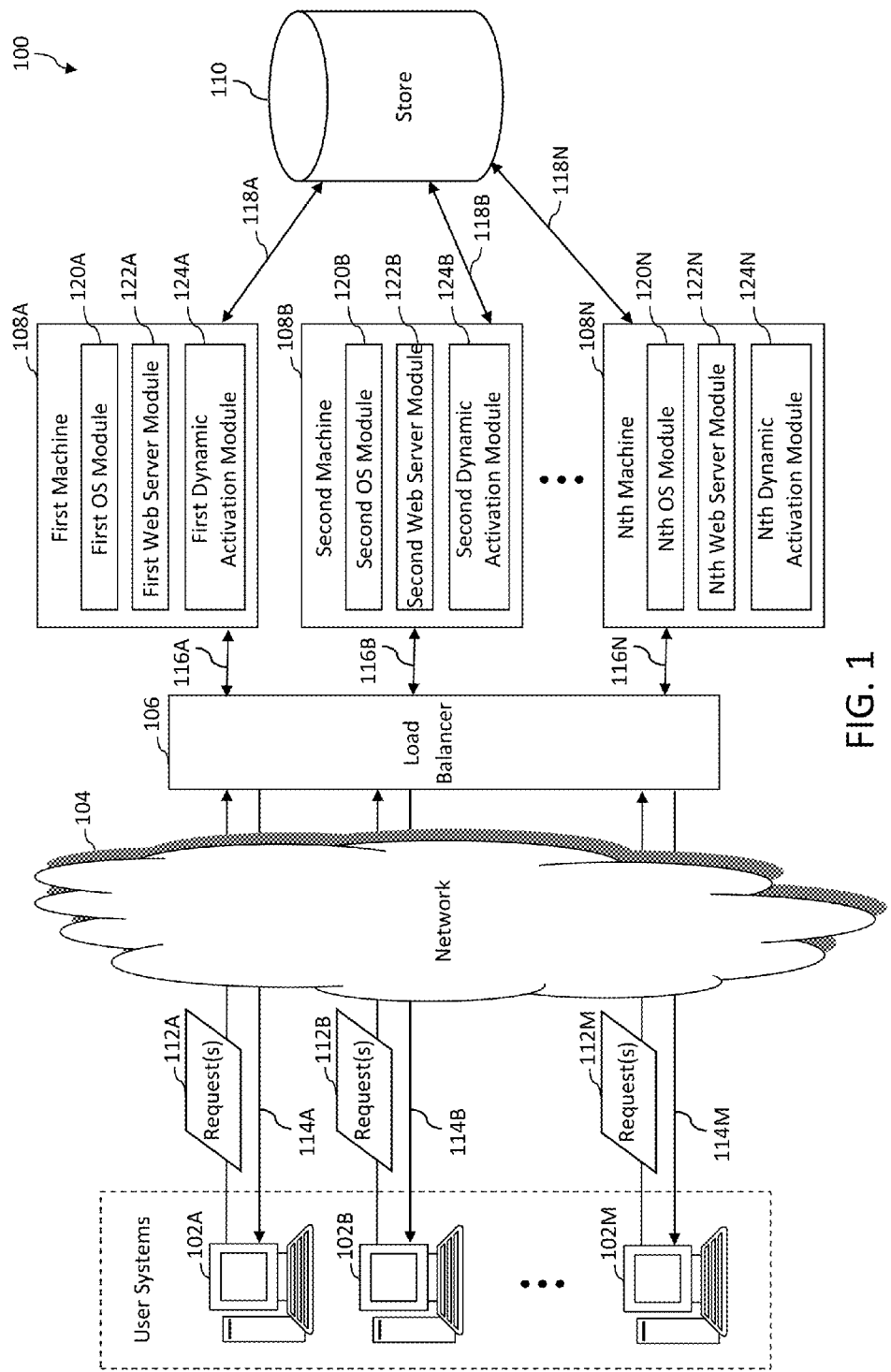

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of dynamically activating web applications. In accordance with example embodiments, web applications are not configured on a machine (e.g., a physical machine such as a web server, or a virtual machine) until requests for those web applications are received by the machine. For example, upon receipt of such a request, the machine may automatically configure a web application that is identified by the request on the machine. The machine may then forward the request to the web application for processing. In another example, the machine may run an application-agnostic worker process, which configures a web application on the machine upon receipt of a request for the web application. An application-agnostic worker process is a worker process that is capable of processing requests for web application(s) that are not previously associated with the application-agnostic worker process. For instance, the application-agnostic worker process may configure the web application based on information that is included in the request. In some aspects, the application-agnostic worker process may cause a specified worker process to run on the machine, so that the specified worker process may process the request and/or subsequent requests for the web application. Accordingly, such subsequent requests may be processed by the specified worker process without first being processed by the application-agnostic application worker process.

Example techniques described herein have a variety of benefits as compared to conventional techniques for activating web applications. For instance, the example techniques may not be dependent on pre-determined assignments of particular web applications to particular machines. Accordingly, such web applications may not be limited to running on only a particular pre-configured machine. The example techniques may enable a machine for which no web applications are setup or assigned to be treated as a homogenous processing resource that is dynamically configured to process network requests for arbitrary web applications on-demand upon receipt of the network requests at the machine. The example techniques may be said to shift machines away from an application-specific/machine-specific model to a distributed model in which machines are dynamically added to or removed from machine clusters. Accordingly, the example techniques may enable a "pull" deployment model in which machines are capable of automatically pulling web applications onto the machines as the web applications are needed.

The example techniques may consume less time and/or fewer resources than the conventional techniques. For instance, the example techniques may not utilize the resources for web applications that are not active. The example techniques may provide greater resiliency, redundancy, availability, etc. than the conventional techniques. The example techniques may be implemented on top of standard off-the-shelf web server technology. Machines that utilize the example techniques may not force any changes in the application architecture or design on developers. Such machines may be compatible with existing load balancing solutions and/or existing network architectures. Moreover, the example techniques may operate independently of upstream load balancing technologies and/or network topologies.

FIG. 1 is a block diagram of an example dynamic activation system 100 in accordance with an embodiment. Generally speaking, dynamic activation system 100 operates to dynamically activate web applications among machines. As shown in FIG. 1, dynamic activation system 100 includes a plurality of user systems 102A-102M, a network 104, a load balancer 106, a plurality of machines 108A-108N, and a store 110. Communication among user systems 102A-102M, load balancer 106, machines 108A-108N, and store 110 is carried out over network 104 using well-known network communication protocols. Network 104 may be a wide-area network (e.g., the Internet), a local area network (LAN), another type of network, or a combination thereof.

User systems 102A-102M are processing systems that are capable of communicating (e.g., indirectly via load balancer 106) with machines 108A-108N. An example of a processing system is a system that includes at least one processor that is capable of manipulating data in accordance with a set of instructions. For instance, a processing system may be a computer, a personal digital assistant, etc. User systems 102A-102M are configured to provide requests 112A-112M (e.g., HTTP requests) to load balancer 106 for the purpose of accessing web applications via one or more of machines 108A-108N. Examples of a web application include but are not limited to webmail, an online retail application, an online auction, a wiki, etc. For instance, a user may initiate a request using a client (e.g., a Web browser, Web crawler, non-Web-enabled client, etc.) deployed on a user system 102 that is owned by or otherwise accessible to the user for the purpose of accessing a web application.

User systems 102A-102M receive access to the web applications that are identified in the respective requests 112A-112M via respective connections 114A-114M and one or more of connections 116A-116N. For instance, user system 102A receives access to web application(s) that are identified in request(s) 112A via connection 114A and one or more of connections 116A-116N, depending on which of the machines 108A-108N execute the web application(s); user system 102B receives access to web application(s) that are identified in request(s) 112B via connection 114B and one or more of connections 116A-116N, depending on which of the machines 108A-108N execute the web application(s), and so on.

In accordance with some example embodiments, user systems 102A-102M are capable of accessing Web sites hosted by machines 108A-108N, so that user systems 102A-102M may access information that is available via the Web sites. Such information may include documents (e.g., Web pages, images, video files, etc.), output of executables, or any other suitable type of information. The Web pages may be provided as hypertext markup language (HTML) documents and objects (e.g., files) that are linked therein, for example. In accordance with these embodiments, the information may be provided by web applications that are identified in requests that are provided by user systems 102A-102M.

Although user systems 102A-102M are depicted as desktop computers in FIG. 1, persons skilled in the relevant art(s) will appreciate that user systems 102A-102M may include any suitable system or device, including but not limited to a laptop computer, a tablet computer, a personal digital assistant, a cellular telephone, etc.

Load balancer 106 is a processing system that determines which of the machines 108A-108N are to receive requests 112A-112M that are received from user systems 102A-102M based on workloads of the respective machines 108A-108N. For instance, load balancer 106 may solicit and receive information regarding the workloads of machines 108A-108N via respective connections 116A-116N. Load balancer 106 may send a request or a group of requests for web application(s) to a specified machine based on the specified machine having a lower workload than others of the machines 108A-108N. For example, load balancer 106 may forward a first subset of the requests 112A-112M to first machine 108A via connection 116A; load balancer 106 may forward a second subset of the requests 112A-112M to second machine 108B via connection 116B, and so on. Load balancer 106 may attempt to distribute workload across machines 108A-108N as described above to increase utilization, increase throughput, minimize response time, and/or reduce a likelihood of overload with respect to one or more of the machines 108A-108N.

Load balancer 106 obtains access to the web applications that are identified in the respective requests 112A-112M via one or more of connections 116A-116N in response to forwarding the requests 112A-112M to one or more of machines 108A-108N. For example, load balancer 106 may obtain access to a first subset of the web applications that are identified by a first subset of the requests 112A-112M from first machine 108A via connection 116A; load balancer 106 may obtain access to a second subset of the web applications that are identified by a second subset of the requests 112A-112M from second machine 108B via connection 116B, and so on. Load balancer 106 provides access to the web applications to user systems 102A-102M via respective connections 114A-114M. For instance, load balancer 106 provides access to the web application(s) that are identified in the request(s) 112A to user system 102A via connection 114A; load balancer 106 provides access to the web application(s) that are identified in the request(s) 112B to user system 102B via connection 114B, and so on.

Load balancer 106 may include a plurality of load balancer instances, though the scope of the embodiments is not limited in this respect. For instance, the load balancer instances may perform load balancing operations collaboratively to determine which of the machines 108A-108N are to receive the requests 112A-112M.

Each of machines 108A-108N is a processing system that is capable of communicating (e.g., indirectly via load balancer 106) with user systems 102A-102M. Each of machines 108A-108N is configured to dynamically activate web applications upon receipt of requests for those applications from load balancer 106. Each of machines 108A-108N is further configured to provide access to the web applications once the web applications are dynamically configured. Each of machines 108A-108N may be a physical machine (e.g., a server) or a virtual machine.

Machines 108A-108N include respective operating system (OS) modules 120A-120N, web server modules 122A-122N, and dynamic activation modules 124A-124N. Each of the OS modules 120A-120N executes an operating system on the machine that includes that OS module. Each operating system performs operations which may include but are not limited to managing computer hardware resources, providing services for execution of web applications, etc. on the corresponding machine. Examples of an operating system include but are not limited to Berkeley Software Distribution™ (BSD), developed and distributed by the Computer Systems Research Group (CSRG) of the University of California, Berkeley, or descendants thereof; Linux developed and distributed under the GNU Project; Mac OS® developed and distributed by Apple Inc., Microsoft Windows® developed and distributed by Microsoft Corporation; and UNIX™ developed and distributed by AT&T.

Each of the web server modules 122A-122N provides access to web applications that are identified by requests that are received from load balancer 106 once the web applications are dynamically configured by a corresponding dynamic activation module. For instance, first web server module 122A provides access to web application(s) that are identified by a first subset of the requests 112A-112M, which is received via connection 116A, in response to dynamic activation module 124A dynamically configuring the web application(s); second web server module 122B provides access to web application(s) that are identified by a second subset of the requests 112A-112M, which is received via connection 116B, in response to dynamic activation module 124B dynamically configuring the web application(s), and so on.

In accordance with some example embodiments, machines 108A-108N host web sites via which information may be accessed by user systems 102A-102M. Such information may include documents (e.g., Web pages, images, video files, etc.), output of executables, or any other suitable type of information. In accordance with these embodiments, the information may be provided by web applications that are identified in requests that are received by machines 108A-108N.

Each of the dynamic activation modules 124A-124N dynamically activates web applications upon receipt of requests for the applications. For instance, upon receiving a request that identifies a web application from load balancer 106, first dynamic activation module 124A may access store 110 via connection 118A to determine whether store 110 includes configuration information regarding the identified web application. If store 110 does not include configuration information regarding the identified web application, first dynamic activation module 124A may send a message indicating that the request is rejected via connection 116A toward the user system from which load balancer 106 received the request. If store 110 does include configuration information regarding the identified web application, first dynamic activation module 124A may dynamically configure the identified web application based on the configuration information. First dynamic activation module 124A may also retrieve metadata and/or content regarding the identified web application from store 110. For example, first dynamic activation module 124A may establish a network binding for the identified web application based on the metadata so that subsequent requests for the identified web application that are received by first machine 108A may be processed directly by the identified web application. In another example, first dynamic activation module 124A forwards the content that is retrieved from store 110 toward the user system from which load balancer 106 received the request. It will be recognized that dynamic activation modules 124B-124N function similarly to first dynamic activation module 124A.

Each of the dynamic activation modules 124A-124N may be implemented in various ways to dynamically activate web applications, including being implemented in hardware, software, firmware, or any combination thereof. For example, any one or more of the dynamic activation modules 124A-124N may be implemented as computer program code configured to be executed in one or more processors. In another example, any one or more of the dynamic activation modules 124A-124N may be implemented as hardware logic/electrical circuitry. In an embodiment, any one or more of the dynamic activation modules 124A-124N may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

In an example embodiment, each of the dynamic activation modules 124A-124N executes a respective instance of a common dynamic activation process. Each instance of the common dynamic activation process may perform a portion or all of the dynamic activation operations described herein with respect to the dynamic activation module that executes the respective instance of the common dynamic activation process.

Store 110 stores information regarding web applications. Such information may include but is not limited to configuration information, metadata, and content regarding the web applications. Configuration information is information that specifies how a web application is to be configured. Metadata may include any suitable information regarding a web application, such as information that indicates a network binding in accordance with which requests for the web application may be processed directly by the web application. Content may include documents (e.g., Web pages, images, video files, etc.), output of executables, etc. Store 110 may be any suitable type of store. One type of store is a database. For instance, store 110 may be a relational database, an entity-relationship database, an object database, an object relational database, an extensible markup language (XML) database, etc. Store 110 is shown in FIG. 1 to be external to machines 108A-108N for illustrative purses and is not intended to be limiting. It will be recognized that store 110 or a portion thereof may be included in any one or more of machines 108A-108N. For instance, store 110 or a portion thereof may be distributed across two or more of machines 108A-108N.

Figure 2:
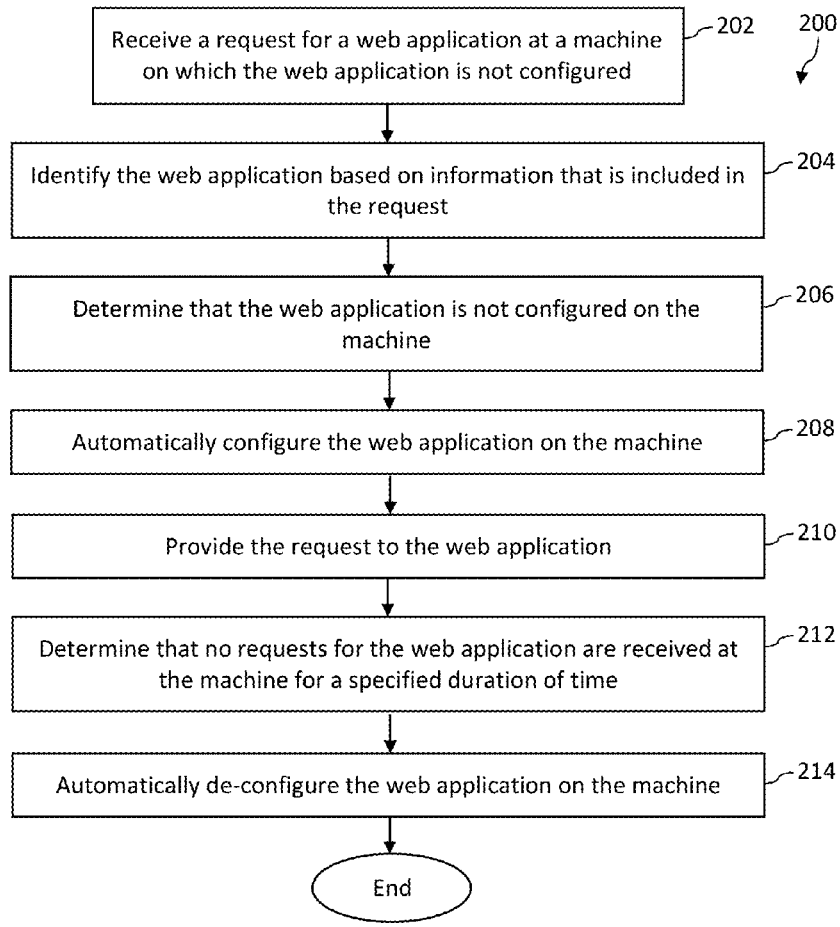
Figure 3:
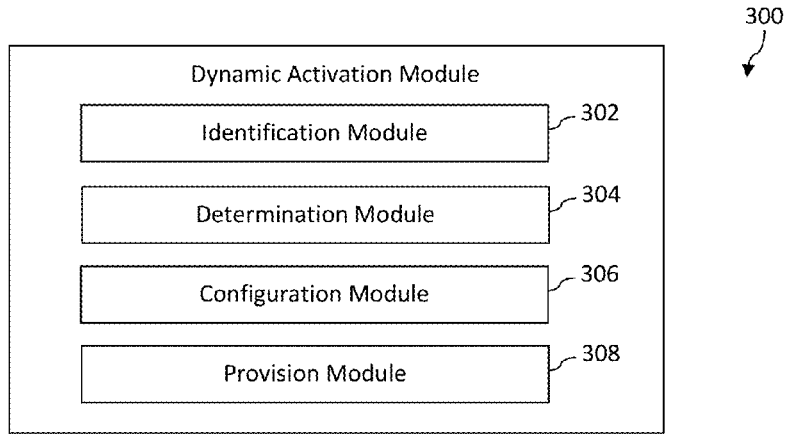
FIGS. 3 and 6 are block diagrams of example implementations of a dynamic activation module shown in FIG. 1 in accordance with an embodiment.

FIG. 2 depicts a flowchart 200 of an example method for dynamically activating a web application in accordance with an embodiment. Flowchart 200 may be performed by any of dynamic activation modules 124A-124N of dynamic activation system 100 shown in FIG. 1, for example. For illustrative purposes, flowchart 200 is described with respect to a dynamic activation module 300 shown in FIG. 3, which is an example of a dynamic activation module 124, according to an embodiment. As shown in FIG. 3, dynamic activation module 300 includes an identification module 302, a detection module 304, a configuration module 306, and a provision module 308. Further structural and operational embodiments will be apparent to persons skilled in the relevant art(s) based on the discussion regarding flowchart 200.

As shown in FIG. 2, the method of flowchart 200 begins at step 202. In step 202, a request for a web application is received at a machine on which the web application is not configured. In an example implementation, identification module 302 receives the request for the web application.

At step 204, the web application is identified based on information that is included in the request. For example, at least a portion of the information may be retrieved from a host header that is included in a packet of the request. In another example, the web application may be based on a uniform resource identifier (URI) that is specified by the request. For instance, a URI may be a uniform resource locator (URL) or a uniform resource name (URN). In accordance with the aforementioned examples, a lookup operation may be performed with respect to a lookup table in a store (e.g., a database) to determine that the information that is included in the request corresponds to the web application. In an example implementation, identification module 302 identifies the web application based on the information that is included in the request.

At step 206, a determination is made that the web application is not configured on the machine. In an example implementation, determination module 304 determines that the web application is not configured on the machine.

At step 208, the web application is automatically configured on the machine. In an example implementation, configuration module 306 automatically configures the web application on the machine.

At step 210, the request is provided to the web application. In an example implementation, provision module 308 provides the request to the web application.

At step 212, a determination is made that no requests for the web application are received at the machine for a specified duration of time. In an example implementation, determination module 304 determines that no requests for the web application are received at the machine for the specified duration of time.

At step 214, the web application is automatically de-configured on the machine. In an example implementation, configuration module 306 automatically de-configures the web application on the machine.

In an example embodiment, the request is received by an application-agnostic worker process that is executed by the machine. In accordance with this embodiment, step 208 includes dynamically configuring a specified worker process, by the application-agnostic worker process, to execute the web application. For instance, the specified worker process may be executed by the machine. In response to dynamically configuring the specified worker process, a network binding may be established between the web application and a network stack of an operating system that is running on the machine. A network stack may be defined as an implementation of a computer networking protocol suite. A network binding between a web application and a network stack directs requests for the web application to the network stack for processing. Accordingly, the specified binding may cause subsequent requests for the web application that are received at the machine to bypass the application-agnostic worker process and to be routed to the specified worker process by the network stack.

In further accordance with this embodiment, the request is provided to the specified worker process at step 210 by the application-agnostic worker process. The specified worker process may provide a response, which corresponds to the request, to the application-agnostic worker process. The application-agnostic worker process may forward the response toward a source of the request (e.g., one of user systems 102A-102M of FIG. 1). Various aspects of the application-agnostic worker process may be executed by any one or more of identification module 302, determination module 304, configuration module 306, and/or provision module 308.

In another example embodiment, step 208 includes generating metadata that indicates that the web application is configured on the machine. In accordance with this embodiment, a second request for the web application is received at the machine. The second request is provided to the web application based on the metadata without re-configuring the web application on the machine. For instance, it may be said that the second request is routed "directly" to the web application because the web application is not re-configured prior to the second request being provided to the web application.

In yet another example embodiment, configuration information regarding the web application may be obtained from a source that is external to the machine. For instance, the configuration information may indicate how the web application is to be configured. In accordance with this embodiment, the web application may be automatically configured on the machine at step 208 based on the configuration information.

In some example embodiments, one or more steps 202, 204, 206, 208, 210, 212, and/or 214 of flowchart 200 may not be performed. Moreover, steps in addition to or in lieu of steps 202, 204, 206, 208, 210, 212, and/or 214 may be performed.

It will be recognized that dynamic activation module 300 may not include one or more of identification module 302, determination module 304, configuration module 306, and/or provision module 308. Furthermore, dynamic activation module 300 may include modules in addition to or in lieu of identification module 302, determination module 304, configuration module 306, and/or provision module 308.

Figure 4:
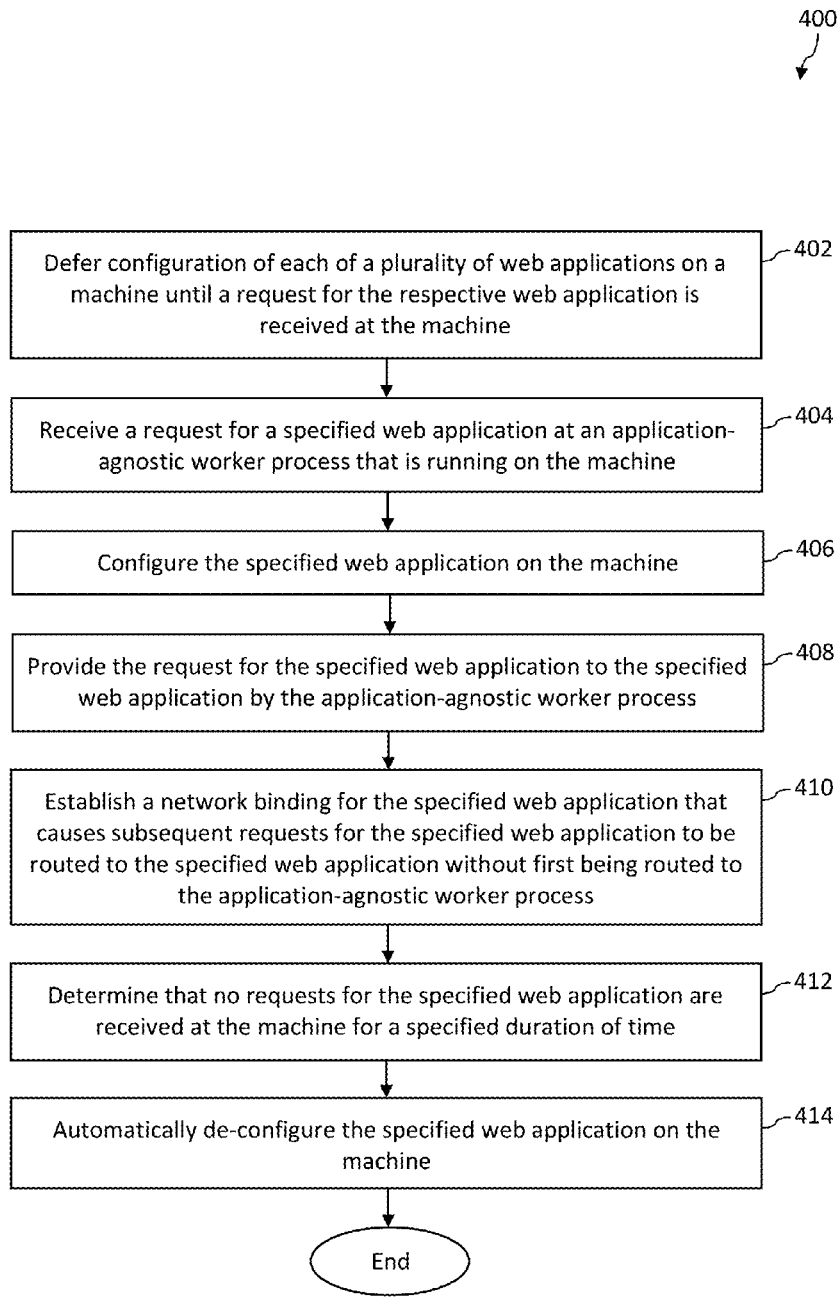
Figure 5:
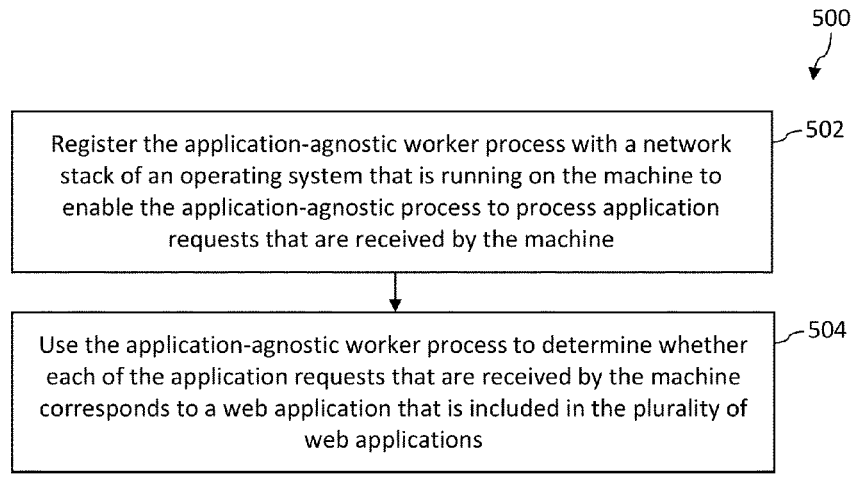
Figure 6:
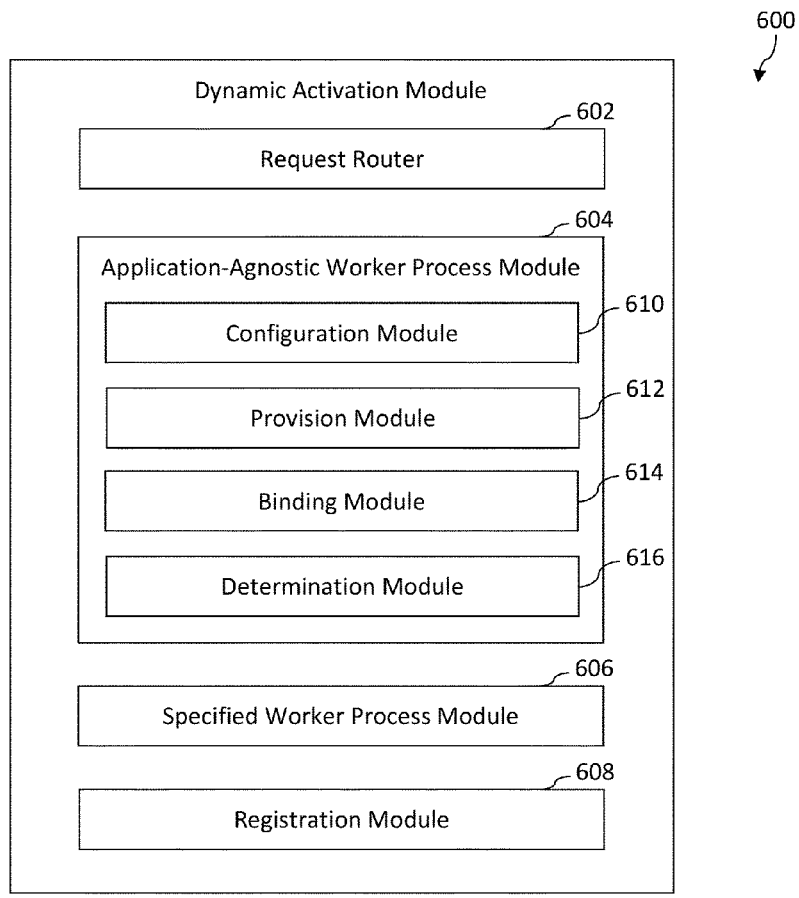

FIGS. 4 and 5 depict flowcharts 400 and 500 of other example methods for dynamically activating a web application in accordance with embodiments. Flowcharts 400 and 500 may be performed by any of dynamic activation modules 124A-124N of dynamic activation system 100 shown in FIG. 1, for example. For illustrative purposes, flowcharts 400 and 500 are described with respect to a dynamic activation module 600 shown in FIG. 6, which is an example of a dynamic activation module 124, according to an embodiment. As shown in FIG. 6, dynamic activation module 600 includes a request router 602, an application-agnostic worker process module 604, a specified worker process module 606, and a registration module 608. Application-agnostic worker process module 604 includes a configuration module 610, a provision module 612, a binding module 614, and a determination module 616. Further structural and operational embodiments will be apparent to persons skilled in the relevant art(s) based on the discussion regarding flowcharts 400 and 500.

As shown in FIG. 4, the method of flowchart 400 begins at step 402. In step 402, configuration of each of a plurality of web applications on a machine is deferred until a request for the respective web application is received at the machine. In an example implementation, configuration module 610 may defer configuration of each of the plurality of web applications on the machine until a request for the respective application is received at the machine.

At step 404, a request for a specified web application is received at an application-agnostic worker process that is running on the machine. In an example implementation, configuration module 610 receives the request for the specified web application. For instance, the application agnostic worker process may receive the request from configuration module 610. In accordance with this example implementation, application-agnostic worker process module 604 executes the application-agnostic worker process.

At step 406, the specified web application is configured on the machine. For instance, the specified web application may be automatically configured on the machine. In an example implementation, configuration module 610 configures the specified web application on the machine.

At step 408, the request for the specified web application is provided to the specified web application by the application-agnostic worker process. In an example implementation, provision module 612 causes the application agnostic worker process to provide the request for the specified web application to the specified web application.

At step 410, a network binding is established for the specified web application that causes subsequent requests for the specified web application to be routed to the specified web application without first being routed to the application-agnostic worker process. For example, the network binding may be established based on information that is included in a host header of a packet that is included in the request. In accordance with this example, the information may identify the specified web application. In another example, the network binding may be established based on a uniform resource identifier that is specified by the request. In accordance with this example, the uniform resource identifier may correspond to the specified web application. In an example implementation, binding module 614 establishes the network binding for the specified web application.

At step 412, a determination is made that no requests for the specified web application are received at the machine for a specified duration of time. In an example implementation, determination module 616 determines that no requests for the specified web application are received at the machine for the specified duration of time.

At step 414, the specified web application is automatically de-configured on the machine. For instance, automatically de-configuring the specified web application may include automatically removing configuration information, metadata, content, and/or machine-local resource reservations regarding the specified web application from the machine. In an example implementation, configuration module 610 automatically de-configures the specified web application on the machine.

In an example embodiment, step 402 includes deferring registration of each of a plurality of uniform resource identifiers (URIs) that correspond to the plurality of respective web applications on the machine until a request for the corresponding web application is received at the machine. In accordance with this embodiment, step 406 includes registering a URI that corresponds to the specified web application on the machine.

In another example embodiment, step 406 includes dynamically configuring a specified worker process to execute the web application. For instance, specified worker process module 606 may execute the specified worker process. In accordance with this embodiment, a response that corresponds to the request for the specified web application is received by the application-agnostic worker process from the specified worker process. The application-agnostic worker process forwards the response toward a source of the request (e.g., one of user systems 102A-102M of FIG. 1).

In some example embodiments, one or more steps 402, 404, 406, 408, 410, 412, and/or 414 of flowchart 400 may not be performed. Moreover, steps in addition to or in lieu of steps 402, 404, 406, 408, 410, 412, and/or 414 may be performed. For example, one or more of the steps shown in flowchart 500 of FIG. 5 may be incorporated into flowchart 400.

As shown in FIG. 5, the method of flowchart 500 begins at step 502. In step 502, the application-agnostic worker process is registered with a network stack of an operating system that is running on the machine to enable the application-agnostic worker process to process application requests that are received by the machine. In an example implementation, registration module 608 registers the application-agnostic worker process with the network stack on the operating system that is running on the machine.

At step 504, the application-agnostic worker process is used to determine whether each of the application requests that are received by the machine corresponds to a web application that is included in the plurality of web applications. For instance, the application-agnostic worker process may be used to determine that the request for the specified web application corresponds to the specified web application. In an example implementation, determination module 616 uses the application-agnostic worker process to determine whether each of the application requests that are received by the machine corresponds to a web application that is included in the plurality of web applications.

In some example embodiments, step 502 and/or step 504 of flowchart 500 may not be performed. Moreover, steps in addition to or in lieu of steps 502 and/or 504 may be performed.

Referring to FIG. 6, request router 602 may determine whether web applications that correspond to respective requests that are received at the machine are configured on the machine. For instance, request router 602 may receive the request for the specified web application before the application-agnostic worker process receives the request at step 404. Request router 602 may be configured to route the request for the specified web application to the application-agnostic worker process in response to the specified web application not being configured on the machine. Request router 602 may be further configured to route the request for the specified web application to the specified worker process in response to the specified web application being configured on the machine. Thus, in some example embodiments, steps 404, 406, 408, and 410 are performed only if request router 602 routes the request for the specified web application to the application-agnostic worker process.

It will be recognized that dynamic activation module 600 may not include one or more of request router 602, application-agnostic worker process module 604, specified worker process module 606, registration module 608, configuration module 610, provision module 612, binding module 614, and/or determination module 616. Furthermore, dynamic activation module 600 may include modules in addition to or in lieu of request router 602, application-agnostic worker process module 604, specified worker process module 606, registration module 608, configuration module 610, provision module 612, binding module 614, and/or determination module 616.

Figure 7:
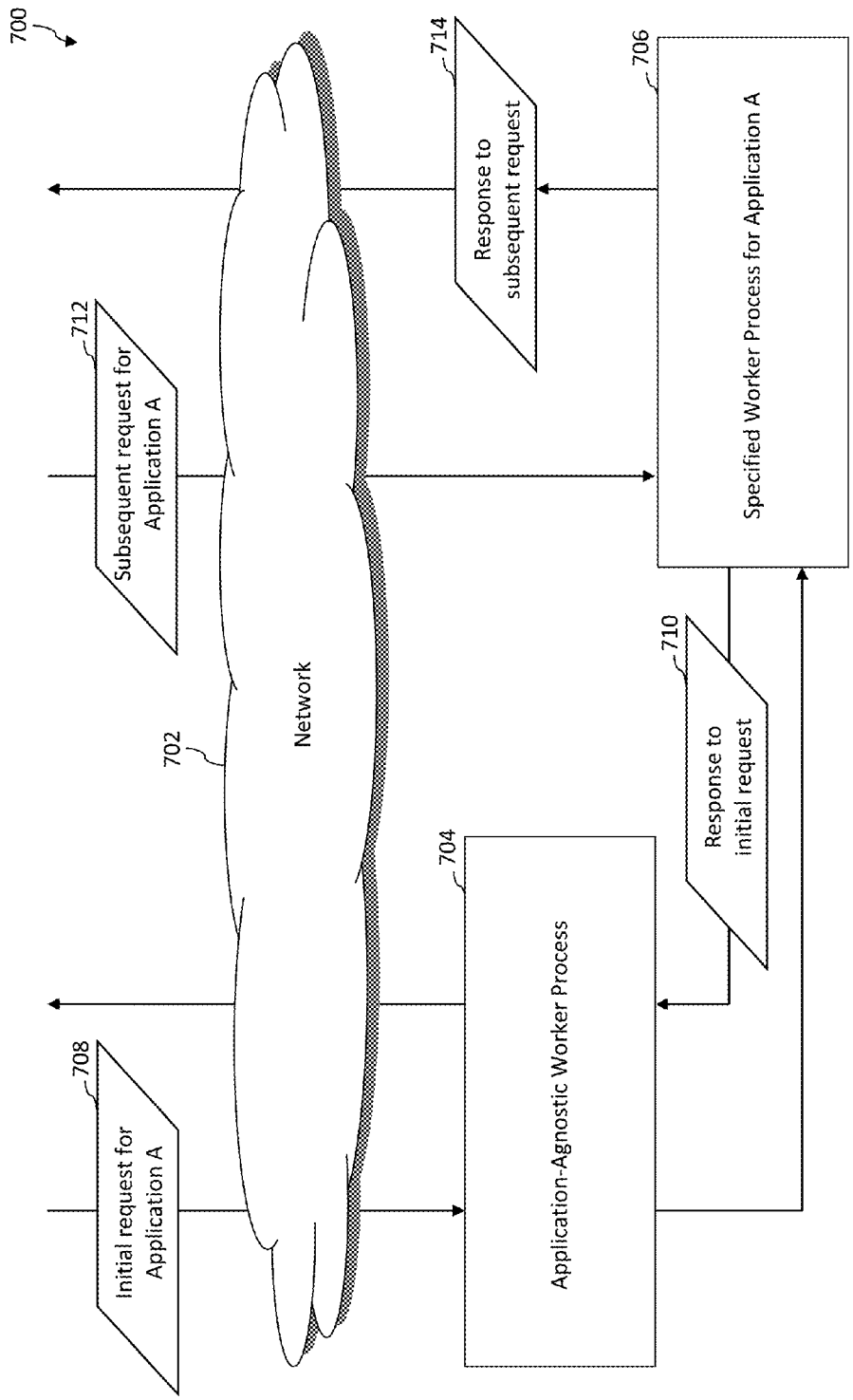
FIG. 7 is a data flow diagram that illustrates processing of requests for a web application in accordance with an embodiment.

FIG. 7 is a data flow diagram 700 that illustrates processing of requests for a web application (referred to as "Application A" for illustrative purposes) in accordance with an embodiment. As shown in FIG. 7, diagram 700 includes a network 702, an application-agnostic worker process 704, and a specified worker process 706 for Application A. An initial request 708 for Application A is received at application-agnostic worker process 704 via network 702. Application-agnostic worker process 704 initiates execution of specified worker process 706 and forwards the initial request 708 to specified worker process 706. Specified worker process 706 provides a response 710 to the initial request to application-agnostic worker process 704. Application-agnostic worker process 704 forwards the response 710 toward a source of the initial request 708 via network 702.

A subsequent request 712 for Application A is received by specified worker process 706 via network 702. It will be recognized that the term "subsequent" in the phrase "subsequent request 712" is intended to mean that the subsequent request 712 is received by specified worker process 706 after the initial request 708 is received by application-agnostic worker process 704. Specified worker process 706 provides a response 714 to the subsequent request to a source of the subsequent request 712 via network 702.

In an example embodiment application-agnostic worker process 704 is executed by application-agnostic worker process module 604 of FIG. 6. In another example embodiment, specified worker process 706 is executed by specified worker process module 606 of FIG. 6.

Load balancer 106, each of OS modules 120A-120N, each of web server modules 122A-122N, each of dynamic activation modules 124A-124N, identification module 302, determination module 304, configuration module 306, provision module 308, request router 602, application-agnostic worker process module 604, specified worker process module 606, registration module 608, configuration module 610, provision module 612, binding module 614, determination module 616, and flowcharts 200, 400, and 500 may be implemented in hardware, software, firmware, or any combination thereof.

For example, load balancer 106, each of OS modules 120A-120N, each of web server modules 122A-122N, each of dynamic activation modules 124A-124N, identification module 302, determination module 304, configuration module 306, provision module 308, request router 602, application-agnostic worker process module 604, specified worker process module 606, registration module 608, configuration module 610, provision module 612, binding module 614, determination module 616, flowchart 200, flowchart 400, and/or flowchart 500 may be implemented as computer program code configured to be executed in one or more processors.

In another example, load balancer 106, each of OS modules 120A-120N, each of web server modules 122A-122N, each of dynamic activation modules 124A-124N, identification module 302, determination module 304, configuration module 306, provision module 308, request router 602, application-agnostic worker process module 604, specified worker process module 606, registration module 608, configuration module 610, provision module 612, binding module 614, determination module 616, flowchart 200, flowchart 400, and/or flowchart 500 may be implemented as hardware logic/electrical circuitry. For instance, in an embodiment, one or more of load balancer 106, each of OS modules 120A-120N, each of web server modules 122A-122N, each of dynamic activation modules 124A-124N, identification module 302, determination module 304, configuration module 306, provision module 308, request router 602, application-agnostic worker process module 604, specified worker process module 606, registration module 608, configuration module 610, provision module 612, binding module 614, determination module 616, flowchart 200, flowchart 400, and/or flowchart 500 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
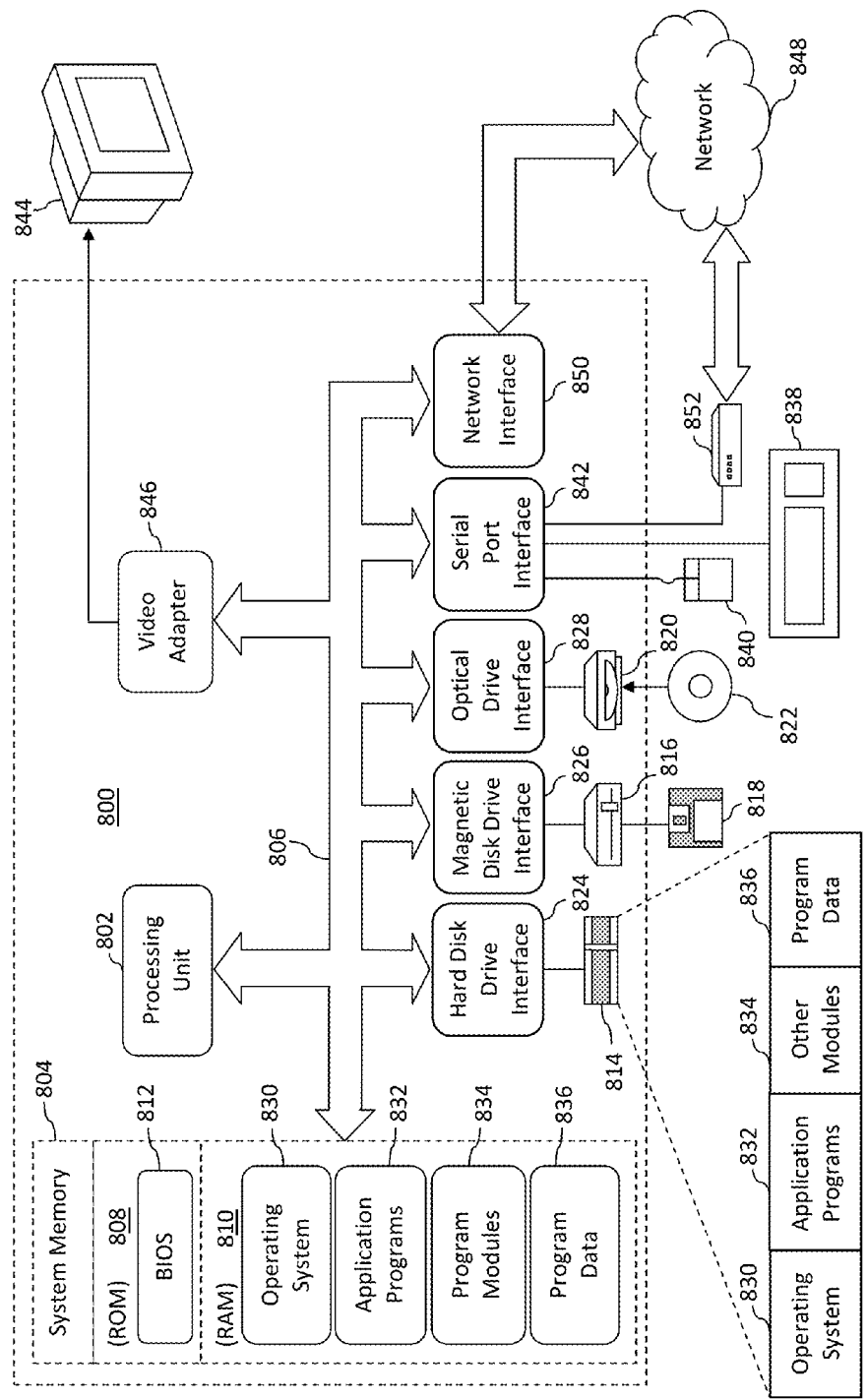
FIG. 8 depicts an example computer in which embodiments may be implemented.

FIG. 8 depicts an example computer 800 in which embodiments may be implemented. Any one or more of the user systems 102A-102M, load balancer 106, or any one or more of machines 108A-108N shown in FIG. 1 (or any one or more subcomponents thereof shown in FIGS. 3 and 6) may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing load balancer 106, each of OS modules 120A-120N, each of web server modules 122A-122N, each of dynamic activation modules 124A-124N, identification module 302, determination module 304, configuration module 306, provision module 308, request router 602, application-agnostic worker process module 604, specified worker process module 606, registration module 608, configuration module 610, provision module 612, binding module 614, determination module 616, flowchart 200 (including any step of flowchart 200), flowchart 400 (including any step of flowchart 400), and/or flowchart 500 (including any step of flowchart 500), as described herein.

A user may enter commands and information into the computer 800 through input devices such as keyboard 838 and pointing device 840. Other input devices (not shown) may include a microphone, joystick, game pad, satellite dish, scanner, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable medium" are used to generally refer to media such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A system comprising:
   at least one element comprising at least one of (a) one or more processors, (b) hardware logic, or (c) electrical circuitry; and
   a dynamic activation module implemented using the at least one element and configured to defer configuration of each of a plurality of web applications on a machine until a request for the respective web application is received at the machine, the dynamic activation module comprising:
      a request router configured to determine whether web applications that correspond to respective requests that are received at the machine are configured on the machine, the request router further configured to route a request for a specified web application to an application-agnostic worker process in response to the specified web application not being configured on the machine, the request router further configured to route the request for the specified web application to a specified worker process that corresponds to the specified web application in response to the specified web application being configured on the machine;
      an application-agnostic worker process module configured to execute the application-agnostic worker process, the application-agnostic worker process module comprising:
         a configuration module configured to configure the specified web application on the machine in response to receipt of the request for the specified web application at the application-agnostic worker process, the configuration module configured to initiate execution of the specified worker process on the specified worker process module;
         a provision module configured to provide the request for the specified web application to the specified worker process;
         a binding module configured to establish a network binding for the specified web application that causes subsequent requests for the specified web application to be routed to the specified web application without first being routed to the application-agnostic worker process; and
         a determination module configured to determine that no requests for the specified web application are received at the machine for a specified duration of time,
            the configuration module further configured to automatically de-configure the specified web application on the machine in response to a determination that no requests for the specified web application are received at the machine for the specified duration of time; and
      a specified worker process module configured to execute the specified worker process.

2. The system of claim 1, wherein the dynamic activation module is configured to defer registration of each of a plurality of uniform resource identifiers that correspond to the plurality of respective web applications on the machine until a request for the corresponding web application is received at the machine; and
   wherein the configuration module is configured to register a specified uniform resource identifier of the plurality of uniform resource identifiers that corresponds to the specified web application on the machine in response to receipt of the request for the specified web application at the application-agnostic worker process.

3. The system of claim 1, wherein the dynamic activation module further comprises:
   a registration module configured to register the application-agnostic worker process with a network stack of an operating system that is running on the machine to enable the application-agnostic worker process to process requests that are received from the request router;
   wherein the application-agnostic worker process module further comprises:
      a determination module configured to determine whether each of the requests that are received by the application-agnostic worker process module corresponds to a web application that is included in the plurality of web applications; and
   wherein the configuration module is configured to configure the specified web application on the machine in response to a determination by the determination module that the request for the specified web application corresponds to the specified web application.

4. The system of claim 1, wherein the specified worker process module is configured to provide a response that corresponds to the request for the specified web application to the application-agnostic worker process; and wherein the provision module is further configured to forward the response toward a source of the request.

5. The system of claim 1, wherein the dynamic activation module is configured to obtain configuration information regarding the specified web application from a source that is external to the machine, the configuration information specifying how the specified web application is to be configured; and wherein the configuration module is configured to configure the specified web application on the machine based on the configuration information.

6. The system of claim 1, wherein the binding module is configured to establish the network binding based at least in part on information that is included in a host header of a packet that is included in the request for the specified web application, the information identifying the specified web application.

7. The system of claim 1, further comprising:

an identification module configured to perform a lookup operation with respect to a lookup table in a store to determine that information that is included in the request for the specified web application corresponds to the specified web application.

8. The system of claim 7, wherein the identification module is configured to retrieve at least a portion of the information from a host header that is included in a packet of the request for the specified web application.

9. A method performed using at least one processor of a processor-based system, the method comprising:

deferring configuration of each of a plurality of web applications on a machine until a request for the respective web application is received at the machine;

determining whether web applications that correspond to respective requests that are received at the machine are configured on the machine;

routing a request for a specified web application to an application-agnostic worker process or to a specified worker process that corresponds to the specified web application depending on whether the specified web application is configured on the machine, the request being routed to the application-agnostic worker process if the specified web application is not configured on the machine, the request being routed to the specified worker process if the specified web application is configured on the machine;

configuring the specified web application on the machine in response to receipt of the request for the specified web application at the application-agnostic worker process;

providing the request for the specified web application to the specified worker process;

establishing a network binding for the specified web application that causes subsequent requests for the specified web application to be routed to the specified web application without first being routed to the application-agnostic worker process;

determining that no requests for the specified web application are received at the machine for a specified duration of time; and automatically de-configuring the specified web application on the machine in response to determining that no requests for the specified web application are received at the machine for the specified duration of time.

10. The method of claim 9, wherein deferring the configuration of each of the plurality of web applications comprises:

deferring registration of each of a plurality of uniform resource identifiers that correspond to the plurality of respective web applications on the machine until a request for the corresponding web application is received at the machine; and wherein configuring the specified web application comprises:

registering a specified uniform resource identifier of the plurality of uniform resource identifiers that corresponds to the specified web application on the machine in response to receipt of the request for the specified web application at the application-agnostic worker process.

11. The method of claim 9, further comprising:

registering the application-agnostic worker process with a network stack of an operating system that is running on the machine to enable the application-agnostic worker process to process requests that are received by the machine; and determining whether each of the requests that are received by the machine corresponds to a web application that is included in the plurality of web applications;

wherein configuring the specified web application comprises:

configuring the specified web application on the machine in response to a determination that the request for the specified web application corresponds to the specified web application.

12. The method of claim 9, further comprising:

providing a response that corresponds to the request for the specified web application to the application-agnostic worker process; and forwarding the response toward a source of the request.

13. The method of claim 9, further comprising:

obtaining configuration information regarding the specified web application from a source that is external to the machine, the configuration information specifying how the specified web application is to be configured;

wherein configuring the specified web application on the machine comprises:

configuring the specified web application on the machine based on the configuration information.

14. The method of claim 9, wherein establishing the network binding comprises:

establishing the network binding based at least in part on information that is included in a host header of a packet that is included in the request for the specified web application, the information identifying the specified web application.

15. The method of claim 9, further comprising:

performing a lookup operation with respect to a lookup table in a store to determine that information that is included in the request for the specified web application corresponds to the specified web application.

16. The method of claim 15, further comprising:

retrieving at least a portion of the information from a host header that is included in a packet of the request for the specified web application.

17. A computer program product comprising a computer-readable medium that is not a signal, the computer-readable medium having computer program logic recorded thereon for enabling a processor-based system to configure at least a specified web application, the computer program product comprising:

a first program logic module for enabling the processor-based system to deferring configuration of each of a plurality of web applications on a machine until a request for the respective web application is received at the machine;

a second program logic module for enabling the processor-based system to determine whether web applications that correspond to respective requests that are received at the machine are configured on the machine;

a third program logic module for enabling the processor-based system to route a request for the specified web application to an application-agnostic worker process or to a specified worker process that corresponds to the specified web application depending on whether the specified web application is configured on the machine, the request to be routed to the application-agnostic worker process if the specified web application is not configured on the machine, the request to be routed to the specified worker process if the specified web application is configured on the machine;

a fourth program logic module for enabling the processor-based system to configure the specified web application on the machine in response to receipt of the request for the specified web application at the application-agnostic worker process;

a fifth program logic module for enabling the processor-based system to provide the request for the specified web application to the specified worker process;

a sixth program logic module for enabling the processor-based system to establish a network binding for the specified web application that causes subsequent requests for the specified web application to be routed to the specified web application without first being routed to the application-agnostic worker process;

a seventh program logic module for enabling the processor-based system to determine that no requests for the specified web application are received at the machine for a specified duration of time; and an eighth program logic module for enabling the processor-based system to automatically de-configure the specified web application on the machine in response to a determination that no requests for the specified web application are received at the machine for the specified duration of time.

18. The computer program product of claim 17, wherein the first program logic module comprises:

logic for enabling the processor-based system to defer registration of each of a plurality of uniform resource identifiers that correspond to the plurality of respective web applications on the machine until a request for the corresponding web application is received at the machine; and wherein the fourth program logic module comprises:
logic for enabling the processor-based system to register a specified uniform resource identifier of the plurality of uniform resource identifiers that corresponds to the specified web application on the machine in response to receipt of the request for the specified web application at the application-agnostic worker process.

19. The computer program product of claim 17, wherein the computer program logic further comprises:

a ninth program logic module for enabling the processor-based system to register the application-agnostic worker process with a network stack of an operating system that is running on the machine to enable the application-agnostic worker process to process requests that are received by the machine; and a tenth program logic module for enabling the processor-based system to determine whether each of the requests that are received by the machine corresponds to a web application that is included in the plurality of web applications; and wherein the fourth program logic module comprises:
logic for enabling the processor-based system to configure the specified web application on the machine in response to a determination that the request for the specified web application corresponds to the specified web application.

20. The computer program product of claim 17, wherein the computer program logic further comprises:

a ninth program logic module for enabling the processor-based system to obtain configuration information regarding the specified web application from a source that is external to the machine, the configuration information specifying how the specified web application is to be configured; and wherein the fourth program logic module comprises:
logic for enabling the processor-based system to configure the specified web application on the machine based on the configuration information.

\* \* \* \* \*